United States Patent
Vilakathara et al.

(10) Patent No.: US 11,879,990 B2
(45) Date of Patent: Jan. 23, 2024

(54) APPARATUSES AND METHOD INVOLVING DIAGNOSTICS OF RADAR CIRCUITRY

(71) Applicant: NXP B.V., Eindhoven (NL)

(72) Inventors: Haridas Vilakathara, Eindhoven (NL); Kai Peter Ludwig Gossner, Neukirchen-Vluyn (DE); Artur Tadeusz Burchard, Eindhoven (NL)

(73) Assignee: NXP B.V., Eindhoven (NL)

( * ) Notice: Subject to any disclaimer, the term of this patent is extended or adjusted under 35 U.S.C. 154(b) by 310 days.

(21) Appl. No.: 17/337,942

(22) Filed: Jun. 3, 2021

(65) Prior Publication Data

US 2022/0390558 A1   Dec. 8, 2022

(51) Int. Cl.
*G01S 7/40* (2006.01)

(52) U.S. Cl.
CPC .............. *G01S 7/40* (2013.01); *G01S 7/4056* (2013.01); *G01S 7/4069* (2021.05)

(58) Field of Classification Search
CPC ......... G01S 7/40; G01S 7/4069; G01S 7/4056
See application file for complete search history.

(56) References Cited

U.S. PATENT DOCUMENTS

| 2018/0188317 A1* | 7/2018 | Maiellaro ............. G01S 7/4056 |
| 2020/0341108 A1 | 10/2020 | Heller |
| 2021/0132190 A1* | 5/2021 | Nishimura ............. G01S 13/931 |
| 2022/0003814 A1 | 1/2022 | Maiellaro et al. |

FOREIGN PATENT DOCUMENTS

| EP | 3454078 A1 | 3/2019 |
| EP | 2936191 B1 | 8/2019 |

OTHER PUBLICATIONS

Jan Schat. "On-line RF Built-in Self-Test using Noise Injection and Transmitter Signal Modulation by Phase Shifter." Design, Automation & Test in Europe (2018), pp. 1009-1010.

* cited by examiner

*Primary Examiner* — Timothy A Brainard
*Assistant Examiner* — Helena H Seraydaryan

(57) ABSTRACT

In one example, a continuous-wave radar circuit receives reflection signals, computer processing circuitry processes data corresponding to the reflection signals, and emulation circuitry introduces a plurality of diagnostic data sets into the radar circuit to cause the radar circuit to process simulated reflection signals as though the simulated reflection signals are reflections from objects remote from the apparatus. The radar circuit may receive the reflection signals in response to chirp sequences actually transmitted as reflections from objects.

20 Claims, 8 Drawing Sheets

APPARATUSES AND METHOD INVOLVING DIAGNOSTICS OF RADAR CIRCUITRY

OVERVIEW

Aspects of various embodiments are directed to radar apparatuses/systems and related methods.

In certain radar signaling applications including but not limited to automotive and autonomous vehicle applications, high spatial resolution may be desirable for detecting and distinguishing objects which are perceived as being located at the similar distances and/or moving at similar velocities. For instance, it may be useful to discern directional characteristics of radar reflections from two or more objects that are closely spaced, to accurately identify information such as location and velocity of the objects.

There are various types of radar systems including continuous-wave (CW) radars or radar system including, as examples, frequency-modulated continuous wave (FMWC) radar systems and unmodulated-continuous wave radars. Using the FMWC-type system as an example for discussion purposes, the radar operation involves radiation of continuous waves that change in terms of their operating frequency. The transmission of radar signal is thereby modulated in frequency (and/or in phase). When transmitted at objects, radar reflection signals are assessed and measured to determine distances of the objects. More specifically, the distance measurements may be accomplished by comparing the frequency of the received signal to a timing reference signal, which may be offset, synchronous and/a function of the transmission signal. Such a timing reference signal may be used as a timing mark to allow the system to time accurately the transmit-and-receive cycle and to convert the cycle into one or more range parameters from which distance is measured. The differences in phase or frequency between the actually transmitted and the received signal may be used to indicate such distance-based parameters.

Using automotive-directed applications of CW radar as an example, the front-end and/or data-processing circuitry typically processes transmitted radar signals and receives and processes reflected signals at very high speeds. Consequently, the CW radar circuitry involved in such applications and the diagnostics can be very complex. For example, many diagnoses of many CW radar circuitries involve use of redundant and/or complex additional integrated circuits with pathways designed to pass signals into and out of particular sections of the front-end and/or data-processing circuitry. These additional integrated circuits are used to stimulate and/or exercise the CW radar circuitries actually involved in realtime front-end and/or data-processing circuitry, as may be appropriate to detect failures and errors at run-time as part of functional operational checks.

Some of these approaches take advantage of the fact that CW radar systems operate as duty-cycle radars. With certain periods in the cycles being non-functional, the above-noted additional integrated circuits are then operated to test and diagnose the radar front-end hardware-software circuitry and the radar-processing hardware-software circuitry during one or more of these non-functional periods. Such additional integrated circuits may also perform such testing and diagnosis by breaking down the front-end and radar-processing circuitries into separate sub-blocks and associated functionalities so that each sub-block and/or associated functionality may be assessed sequentially one by one (e.g., via built-in self-test, or BIST, circuits) using special tests respectively designed for each such sub-block and/or functionality, and with separate test outcomes collected so as to produce an overall score or result.

Further, the testing-and-diagnosis approaches may involve excessive delays, design complexities and/or lead to errors and related challenges to efficiencies and accurate testing of CW radar systems for a variety of applications.

SUMMARY

Various example embodiments are directed to issues such as those addressed above and/or others which may become apparent from the following disclosure.

In certain examples according to the present disclosure, embodiments involve or are directed to a radar circuit to receive reflection signals, computer processing circuitry to process data corresponding to the reflection signals, and emulation circuitry to introduce a plurality of diagnostic data sets into the radar circuit to cause the radar circuit to process simulated reflection signals as though the simulated reflection signals are reflections from objects at respective distances remote from the apparatus. The radar circuit may receive the reflection signals in response to chirp sequences transmitted as reflections from objects at respective distances remote from the apparatus. The computer processing circuitry may to generate output data indicative of distance, velocity and/or angle-of-arrival by correlating the output data relative to a reference associated with the transmitted radar signals.

In yet further examples related to one or more of the above examples, the first effective signal delay may be used (e.g., between chirps) to assess integrity for measuring distance parameters and/or each of the plurality of diagnostic data sets may further includes a second effective signal delay which may be used between the chirp sequences to introduce phase offset as may be used to assess integrity for measuring velocity parameters.

In more specific examples related to one or more of the above examples, the emulation circuitry includes logic circuitry to control at least certain of the transmit phase rotators to position the first effective signal delay and the second effective signal delay. More specifically, in one such more-specific example, a first effective signal delay (between chirps) may be used to assess integrity associated with measuring the distance, a second effective signal delay (between chirp sequences) may be used to assess integrity associated with measuring velocity, and a third effective signal delay may be used with certain circuitry to assess integrity associated with measuring direction of arrival.

The above discussion/summary is not intended to describe each embodiment or every implementation of the present disclosure. The figures and detailed description that follow also exemplify various embodiments.

BRIEF DESCRIPTION OF FIGURES

Various example embodiments may be more completely understood in consideration of the following detailed description in connection with the accompanying drawing through each of FIGS. 1 through 8 which, in accordance with the present disclosure, show test circuitry useful in a functional mode of radar operation. More particularly.

Figure 1:
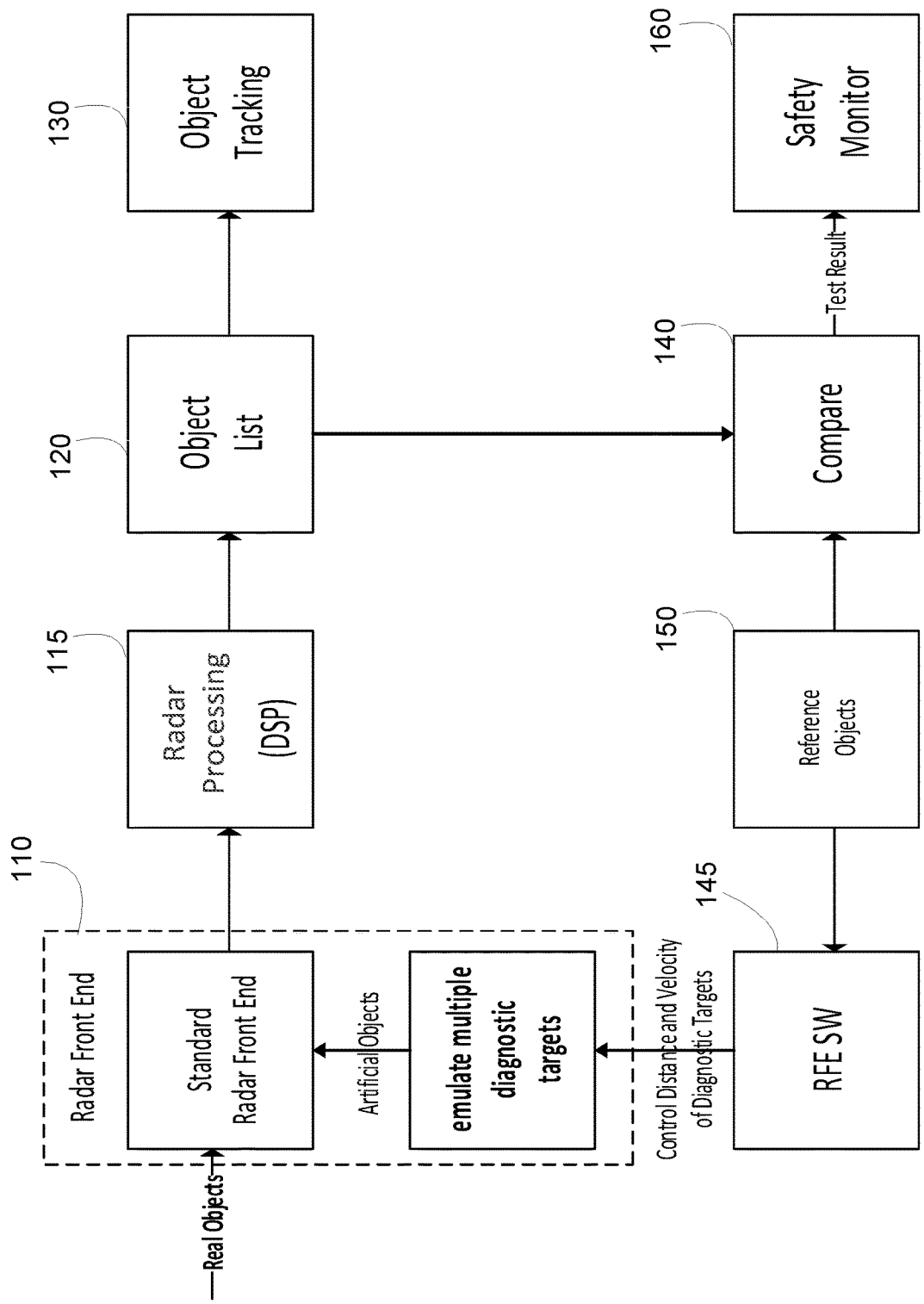
FIG. 1 is a circuit-based block diagram illustrating an example radar apparatus with effectively-transparent diagnostic capabilities.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving certain exemplary radar-based systems which transmit waves continuously such as exemplified by but not limited to FMCW radar systems. In certain implementations, aspects of the present disclosure have been shown to be beneficial when used in the context of automotive-related applications but the present disclosure is not necessarily so limited. However, it is in this context that various aspects of the present disclosure are discussed as may be appreciated through the following discussion of non-limiting examples.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

In one example, the present disclosure is directed to a radar system and/or a method of using a radar system, and the system may be viewed as having three main parts: front-end circuitry including a radar circuit, computer processing circuitry, and emulation circuitry. The front-end circuitry is configured to receive reflection signals, in response to chirp sequences transmitted as reflections from objects at respective distances remote from the apparatus. The computer processing circuitry is configured to process data corresponding to the reflection signals and, in response, to generate output data indicative of distance, velocity and/or angle information. Finally, the emulation circuitry is configured to introduce one or more sets of diagnostic data into the radar circuit to cause the radar circuit to process simulated reflection signals as though the simulated reflection signals are reflections from the remote objects, each diagnostic data set being respectively associated with one or more simulated targets and including a first effective signal delay.

In more specific example embodiments which may be used to build on the above example(s), the emulation circuitry is used alone (without any further redundant or built-in-self-test (BIST) circuitry) for testing the various subsections of logic circuitry in each of the above-noted three main parts. In this context, the radar system with the emulation circuitry according to the present disclosure may be viewed as embedding transparent diagnostics.

The radar circuit may include a receive mixer to mix signals corresponding to the chirp sequences with the received reflection signals in response to the chirp sequences as reflections from objects at respective distances remote from the apparatus, and the receive mixer may be used to mix the chirp sequences with a phase and/or frequency offset of the transmission's carrier frequency. With a delay being added (to the transmit signal), via mixing in the front-end circuitry, effective delays are created as though signals output from the receive mixer are received reflection signals. In this manner, the radar circuit may create simulated reflection signals for purposes of self testing and while not necessary, this self testing may occur in realtime (or at least near realtime) while the radar circuit/system is in operation for sensing distance, velocity and/or direction of real objects located remotely from the radar circuit or system. More specifically, this phase and/or frequency offset may be implemented to cause a low frequency signal to be introduced between chirps and between chirp sequences for indicating desired frequency and distance in integrity testing of the radar circuit and the computer processing circuitry.

In connection with further more specific example embodiments which may also be built using aspect from one or more of the above example(s), the radar system may be of the frequency-modulated continuous wave (FMWC) type with chirp sequences being transmitted by a transmit section of the front-end circuitry as swept-frequency radar signals, and wherein the radar circuit, computer processing circuitry and the emulation circuitry are integrated as part of the radar system.

In such a context, the radar device may send series of "chirps", which are short sinusoidal signals characterized by its frequency increasing as function of time. When such signals return to radar bounced of objects, they are shifted in phase as a function of distance of the object from the radar device. Since signals have increasing frequency due to this delay a small frequency difference exists between transmitted and received signal. Hence, when transmitted and received (delayed) signals are mixed, the above-noted low frequency signal may be produced with its frequency being a function of the distance. This distance can be detected by an FFT (fast-Fourier transform) function performed on sampled transmit-receive (Tx-Rx) mixed signal.

Further, such chirps may be sent in repeating groups called chirp sequences. When objects reflecting the chirp signals move, there exists phase difference between chirp sequences that are related to the distance the object moved between the chirps which represents the object velocity. This velocity can be detected using second FFT done on the results of the distance FFT. Chirp sequences may be separated by idle time, for example, to permit the radar sensor circuit/system to return to stable operating parameters and to avoid overheating. As FMCW radars may be considered duty-cycle radars with active and idle period, a long possible active time and a short possible idle time may be implemented, for example, to increase radar resolution and update rate. Certain trending in radar technology is to limit idle time and if possible in the future use continuous acquisition mode. For more information regarding uses of the idle time, reference may be made to the international standard organization which has defined a structured methodology to build automotive system and components through the ISO26262 standard (including requirements to ensure that the integrity of the systems may be checked through in-field diagnostic measures or self-tests).

In addition to effective delay signals between chirps and between chirp sequences that are related to simulating distance and velocity, angle of arrival may also be assessed with yet another effective delay. With multiple antennas spaced apart from one another, a common wave transmitted and bounced of one or more objects results in a different delay difference (related to the physical TX antenna (set) distance). By using a $3^{rd}$ FFT between antenna samples (or another processing technique) angle-of-arrival can be calculated. Accordingly, with one or more of these effective delays, distance, velocity and/or angle-of-arrival measurements may be simulated for integrity testing of the front-end circuitry and/or ensuing processing circuitry.

In yet further specific examples, the radar system is designed to introduce known artifacts (radar objects) in the functional radar signal that can be used to confirm correct radar operation and to diagnose problems without a need of separate tests and separate test period, using a single test instead in functional mode instead of many tests in special test mode (where the functional mode refers to the radar front-end circuitry and/or processing circuitry being in a normal operational mode as opposed to the special mode in the same circuitry is strictly used for testing). This artificial introduction of such diagnostic objects in the radar signal may be at the radar front-end circuitry (or alternatively just after the front-end circuitry for a less robust testing approach) so as to be associated with known distance and velocity positions. The functional hardware and/or software of the radar system thereby becomes also diagnostic, as the functional radar processing chain is to confirm the presence of the test objects against reference objects (the delayed timing of which may be associated with a calibration reference signal); hence, this may be used to confirm the correct operation of the complete radar data path during its primary radar-related operation. In this regard, the introduction of such diagnostic objects may be done in a way to minimize effect on detectability of real objects and for a radar object tracker to filter this diagnostic objects out to avoid ghost targets.

In certain specific implementations, the radar system(s) may include some options and/or features as follows. One is not changing the context to special test mode, but rather inserting the artificial objects during functional mode so as not to interfere with the normal operation of the radar system. In this manner, the functional mode and test mode are combined into a single mode of operation. Another is to diagnose over a larger portion of radar system instead of testing the radar system in individual blocks, thereby providing the ability to diagnose over the whole functional system circuitry paths (excluding the antenna interface) with one-hundred percent coverage, and this full coverage may still use a BIST period but would perform the testing via use of the functional mode by inserting the artificial objects and detecting them. Further, the idle time in between chirps may be reused and this may still the same setting (so the same mode) as the functional mode even though is it idle, thereby using otherwise unused radar-signal sensor time.

Other related specific example embodiments according to the present disclosure may use as part of the emulation, as examples, one effective signal delay, or two or three effective signal delays with the latter for direction- and/or angle-of arrival (DoA) information. As an example, the first effective signal delay may be implemented as an offset to the chirp frequency (via the carrier) to create the simulated reflection signals so as to introduce a frequency offset between the received, simulated reflection signals as they are processed by a receive path of the radar circuit. As a more specific exemplary aspect, the first effective signal delay may be used to effect a continuous change of phase offset. In this context, the first effective signal delay may be used to test the radar circuit and computer processing circuitry to assess the integrity of the radar system for measuring distance parameters.

In another example involving one or more additional effective signal delays, each diagnostic data set may further include a second or more effective signal delays between the chirp sequences. Each such additional effective signal delay may be used to introduce a phase offset. Together, these effective signal delays (e.g., a first for a frequency offset and a second for a phase offset) may be used to test more robustly the functionality of the radar circuit and computer processing circuitry for assessing integrity in connection with accuracy in measuring distance, velocity and/or angle parameters.

In yet further examples also useful for building on one or more of the above examples, each of the plurality of diagnostic data sets may further include one or multiple effective signal delays between the chirp sequences to introduce one or more phase offsets, and the emulation circuitry and/or the radar circuit may be used to transmit phase rotators to position the first effective signal delay and the second effective signal delay. Logic circuitry (based primarily in circuitry/hardware or software) may be used to control at least certain of the transmit phase rotators to position the first and second effective signal delays.

Non-limiting specific example approaches for implementing each of the above aspects are presented below in connection with the figures.

The drawings of the present disclosure illustrate some of the above, and other, exemplary aspects and embodiments. FIG. 1 is a circuit-based block diagram illustrating an example radar apparatus with effectively-transparent diagnostic capabilities and showing one example of how such a diagnostic system may arrange radar integrated circuitry for performing diagnostics, based on the above-discussed self-testing emulation operations as in a functional mode, during the functional radar operational period in which normal radar-based object sensing may be occurring. The diagram of the example radar apparatus in FIG. 1 is depicted with a receive signal path defined by circuit blocks including a radar front end or RFE 110, a radar (signal) processing block (e.g., digital signal processor) 115 which may be conventional, an object list circuit (e.g., memory array) 120 to list initially-identified objects, and an object tracking circuit 130 to keep track of actual objects sensed by the apparatus. Such circuitry may be implemented separately, collectively as an integrated circuit package and/or via various combinations (e.g., blocks 120 and 130 as memory circuits separated from at least the RFE 110). The RFE 110 includes radar circuitry which is conventional to CW radar sensing systems such analog radar-signal transmit and receive circuitries (e.g., including timing circuits, mixers, antenna interfaces and/or antenna arrays). Also depicted is a feedback processing signal path defined by circuit blocks including compare (logic) block 140 to compare initially-identified objects with simulated reference objects provided from a calibration data set stored in memory block 150, and an output circuit 160 to store and/or process test results ensuing from the comparisons. The data set stored in memory block 150 may also be used by RFE software 145 to provide emulation circuitry (e.g., data processor) within the RFE 110 with parameters to calibrate and control distance and velocity of diagnostic or simulated targets for self testing of the apparatus. In this manner, the apparatus or radar circuit of FIG. 1 may use the RFE 110 to receive reflection signals from real objects or from artificial objects, and may use computer processing circuitry (e.g., a digital signal processor (DSP) chip) to process data corresponding to the reflection signals. With regards to the artificial objects, the emulation circuitry internal to the RFE 110 may introduce a plurality of diagnostic data sets into the radar circuit to cause the radar circuit to process simulated reflection signals as though the simulated reflection signals are reflections from objects at respective distances remote from the apparatus. In this manner, the radar circuit may receive the reflection signals in response to chirp sequences transmitted as reflections from objects at respective distances remote from the apparatus, with the computer processing circuitry generating output data indicative of distance, angle-of-arrival and/or velocity by correlating the output data relative to a calibration reference (via block 150) associated with the transmitted radar signals.

Figure 2:
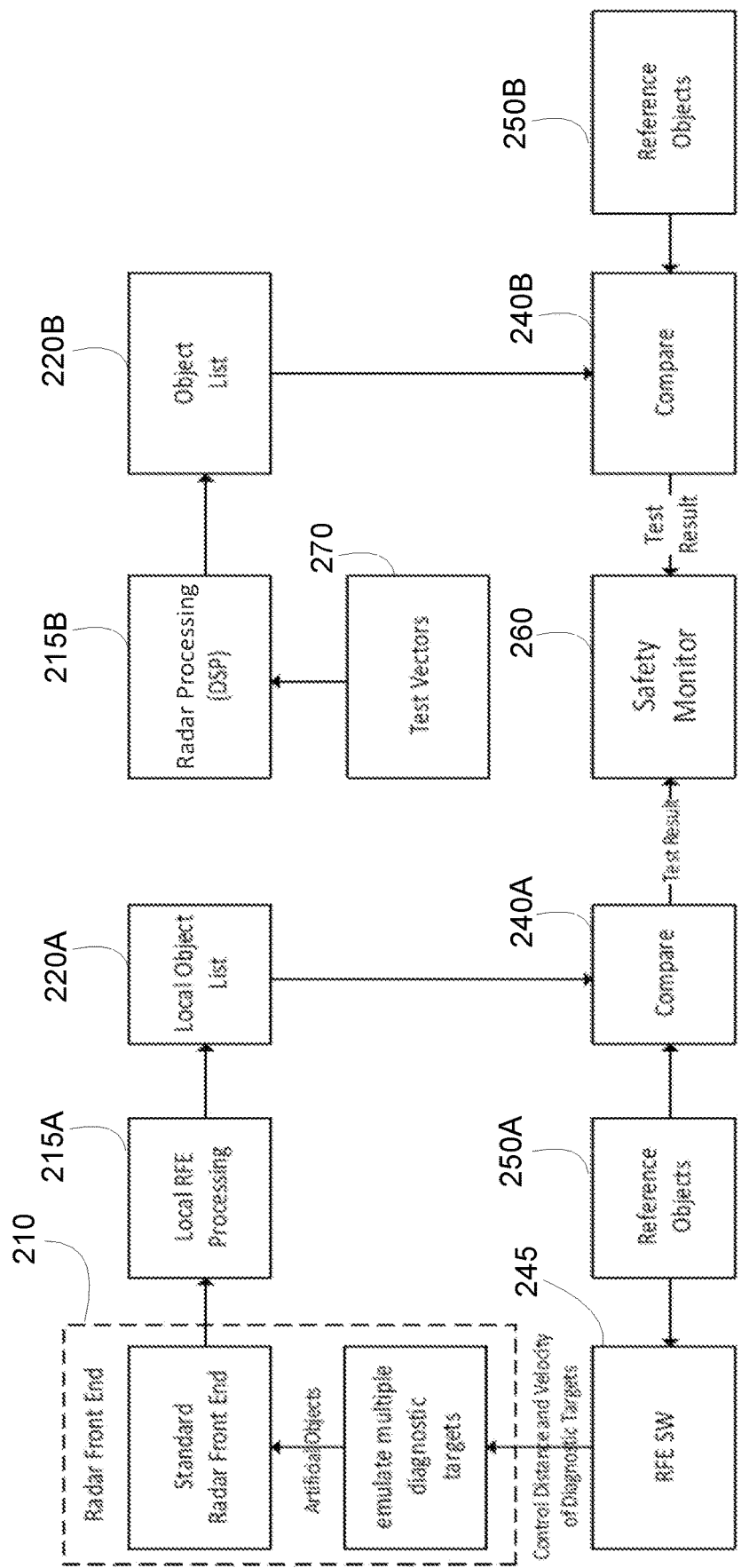
FIG. 2 is a circuit-based block diagram illustrating an alternative example radar apparatus with effectively-transparent diagnostic capabilities.

Related to the apparatus of FIG. 1, FIG. 2 is a circuit-based block diagram illustrating an example radar apparatus with effectively-transparent diagnostic capabilities in a functional mode and with similarly-depicted blocks as in FIG. 1 with corresponding blocks indicated by the least two significant digits of the reference numerals (e.g., 110 and 210, 115 split into 115A and 115B, 120 and 220, 140 split into 140A and 140B, etc.). As a variation to the arrangement of circuit blocks in FIG. 1, the example of FIG. 2 shows such circuitry with the diagnosis being performed in functional mode, separately for the front-end circuitry and the radar signal processing circuitry. As with block 160 in FIG. 1, a safety-monitor circuit 260 may be included and also separated if needed for a split IC (integrated circuit) radar system. A memory-based circuit 270 is shown as being separated for providing test vectors to the radar processing circuit 215B. Further, using blocks 240B, 250B and 260, diagnostics of the radar circuitry performed in functional mode may be done separately for front-end and radar processing circuitries. This is useful, for example, in cases where the radar system is split into front end circuitry and radar processing circuitry.

FIGS. 3-8 show more specific example circuits and techniques for various ways of building such a system as in one of the above-disclosed examples. Such techniques, to introduce diagnostic objects, may insert an effective signal delay between TX and RX signals (introducing frequency offset between RX and Tx via continuously changing phase offset) between chirps (for distance) and to insert an effective signal delay between TX and RX signals (introducing frequency offset via continuously changing phase offset) between chirp sequences (for velocity) using Tx phase rotators being controlled (or adjusted) using circuit/logic hardware and/or configurable code/software to place them at the desired position. When mixing Rx and Tx signals, low frequency signals are introduced between chirps and between chirp sequences indicating desired frequency and distance. The delay/frequency offsets are used for determining distance and velocity position of the objects for distance and velocity FFTs. Also, front-end circuitry integrated with the radar circuit may be used with such phase rotator circuitry to effect a phase offset or phase adjustment in radar signals communicated via the front-end circuitry, wherein the phase offset or phase adjustment is compensated or accounted when using the emulation circuitry in a functional radar mode.

Figure 3:
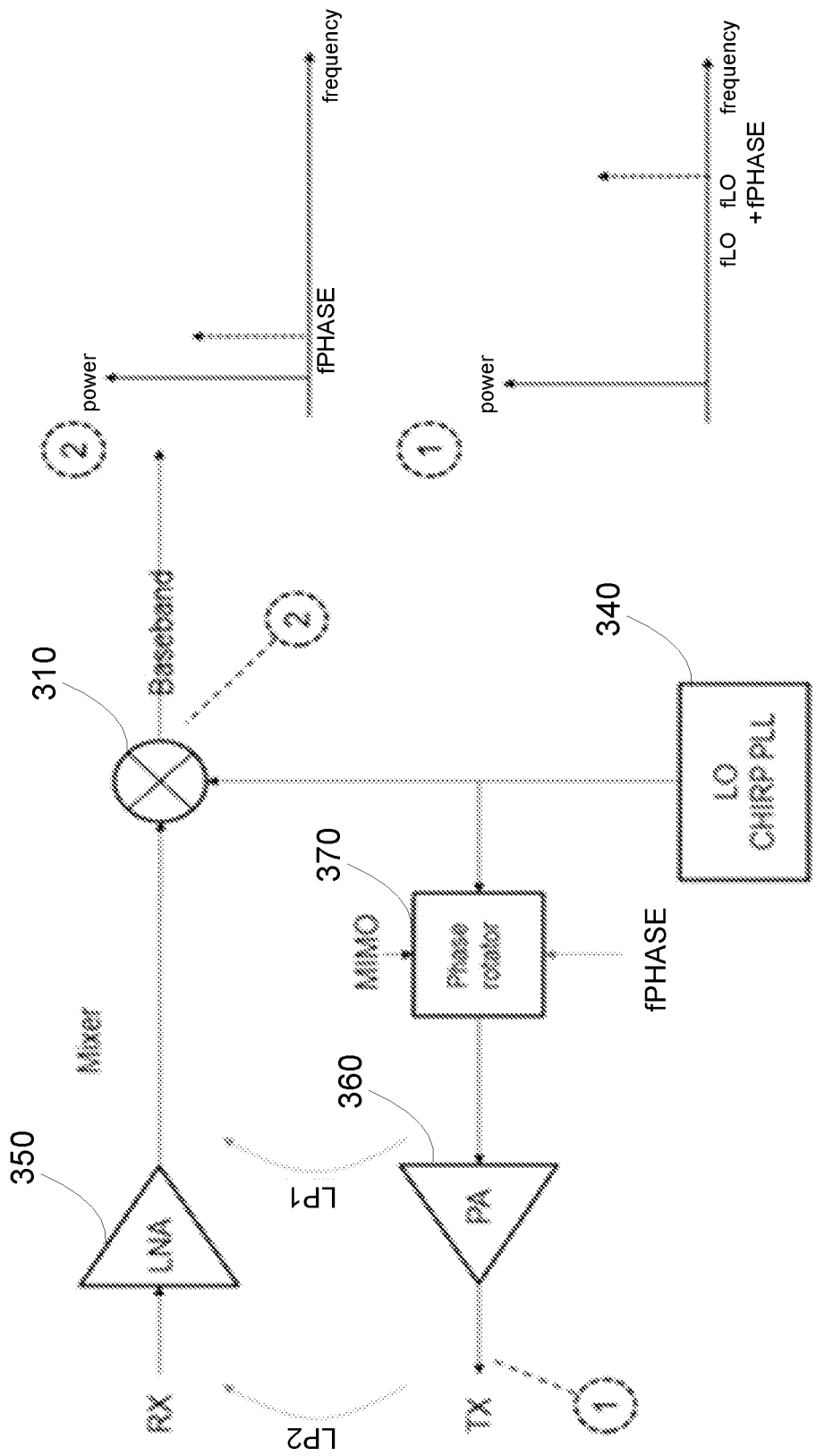
FIG. 3 is a circuit-based block diagram illustrating exemplary signal flow and related circuits of a radar apparatus such as the above described/illustrated embodiments.

More specifically, FIG. 3 is a circuit-based block diagram illustrating exemplary signal flow and related circuits of a radar apparatus such as the above described/illustrated embodiments which may have effectively-transparent diagnostic capabilities in a functional mode. The circuitry of FIG. 3 shows a radio frequency (RF) loopback principle as may be integrated and/or applicable in such previously exemplified systems. Via IC internal (LPP1) and external coupling (LP2) the transmitted signal propagates from transmitter to receiver. The receiver mixer 310, in standard FMCW radar, is operated with the same frequency as the transmit (TX) path is transmitting. By utilizing a phase rotator 370 and applying a continuous phase rotation to its PHASE input, the transmit frequency is increased by the frequency of the continuous phase rotation (fPHASE) in comparison to local oscillator (LO) signal as provided by the LO/Chirp PLL (phase-locked loop) 340. The TX frequency basically gets up-mixed at receive mixer 310 to a higher frequency as also provided by the LO/Chirp PLL (phase-locked loop) 340. Encircled depiction 1 shows the resulting spectrum for a static continuous-wave case, and encircled depiction 2 shows the resulting baseband spectrum, in presence of a continuous phase rotation applied to the transmit phase shifter. As is conventional in such RF circuitry, LNA 350 and PA 360 respectively represent low-noise and power amplifiers.

Figure 4:
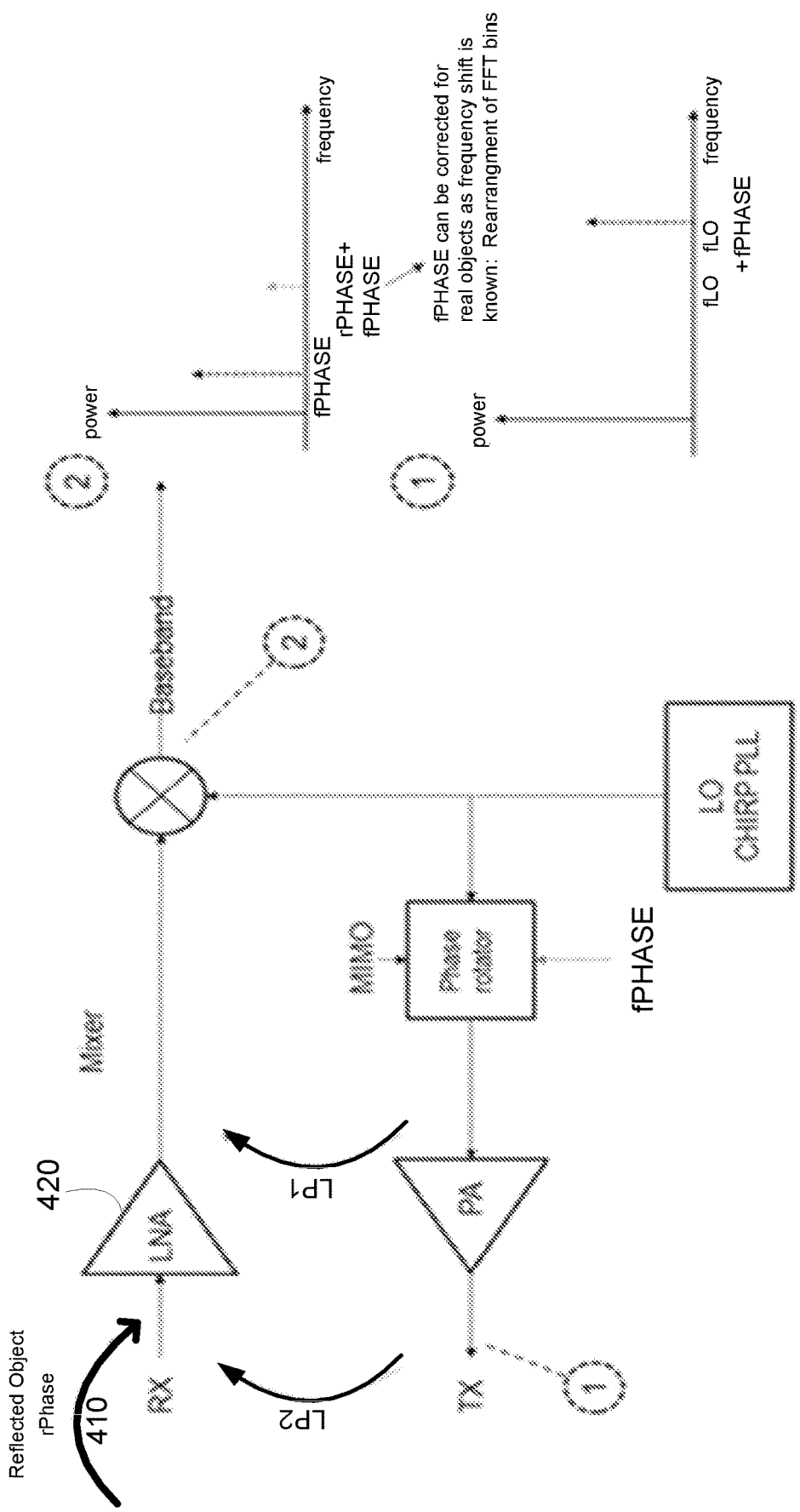
FIG. 4 is a circuit-based block diagram illustrating an example radar apparatus, also related to the above examples, and highlighting a radio-frequency (RF) loopback technique.

Similar to FIG. 3, FIG. 4 is a circuit-based block diagram illustrating an example radar apparatus also with effectively-transparent diagnostic capabilities in a functional mode and with RF Loopback principle in presence of reflected objects, also in accordance with the present disclosure. Modifying the TX frequency shifts the signals indicating the real reflected objects (as indicated at the RX input port 410 to the LNA 420), and that needs to be compensated. The frequency shift, if introduced by the phase rotator, should set the sensed parameters such that they land on the fast-Fourier-transform (FFT) grid as may be conventionally used by the radar apparatus, and this may be apparent in multiple ones of the desired FFT bins. This then permits for correction to be performed after an FFT block (not shown) at an FFT output port by stringboard remapping of bin numbers to frequencies. The phase shifter is to be very linear, in the sense of, that 180 degrees is set, the result is very close to 180 as opposed to 170 (e.g., 3-10 percent), because this will create additional targets too and just a single target is sought. Also, an unclean phase change may introduce harmonics and uncontrolled shift in the sensed frequency of signals corresponding to real objects, and this may be present a difficult issue for which to compensate. To produce a diagnostic (or virtual) object for circuit testing purposes, the TX Phase Rotators that are in radar ICs (for the purpose of MIMO (Multiple Input Multiple Output) or other types of processing) can be reused. Note that adding such a diagnostic object is orthogonal to (MIMO) phase rotator setting and may also be applied on top of, without modifying, an applicable MIMO scheme. The encircled depicters 1 and 2 of FIG. 3 show the power-frequency effects of the loopback.

Figure 5:
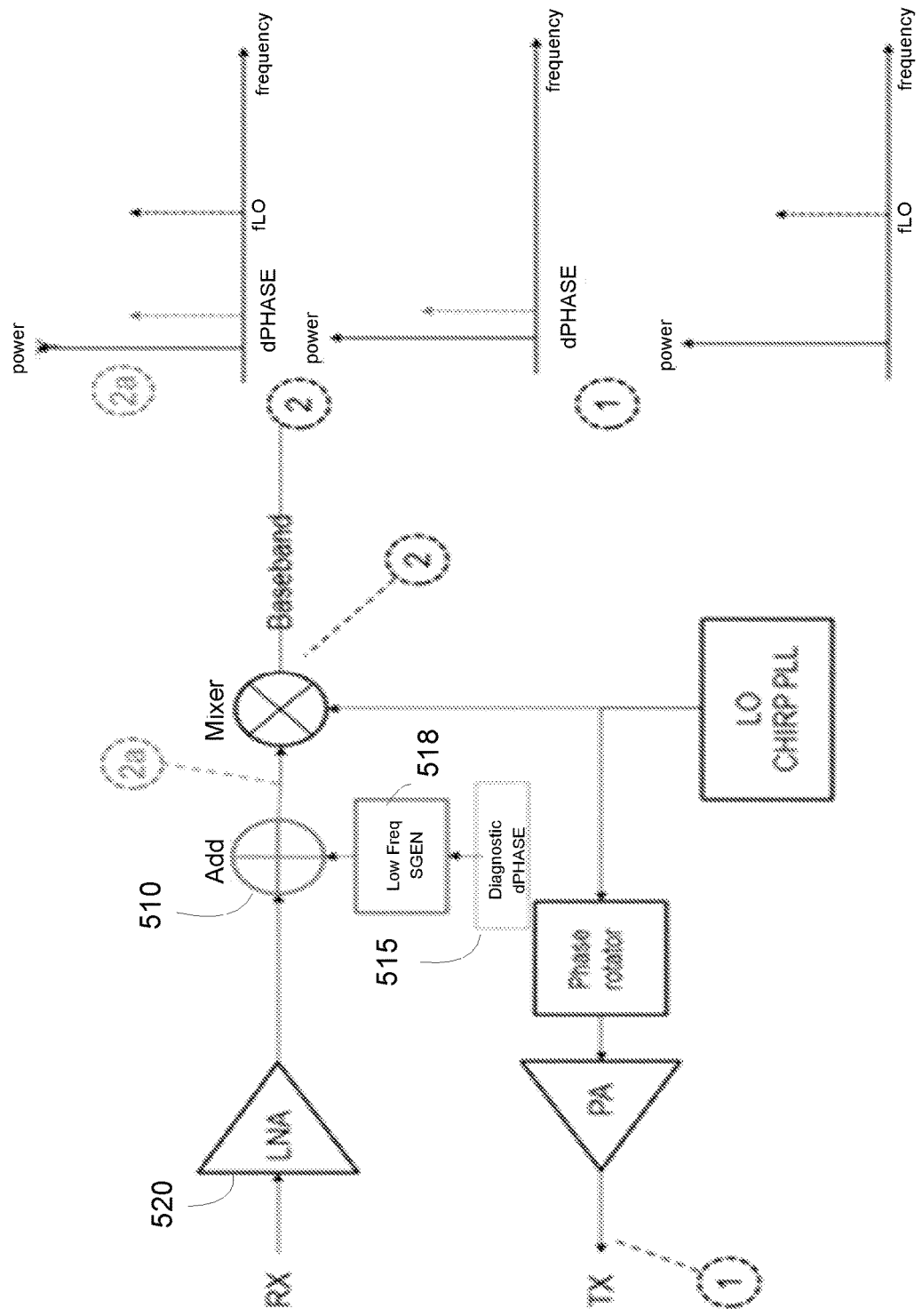
FIG. 5 is a more-detailed circuit-based block diagram illustrating an example radar apparatus illustrating one way of adding a diagnostic object in the receive path.

In this above-discussed context and also in accordance with the present disclosure FIGS. 5, 6, 7 and 8 show example circuit implementations as alternatives to that shown in connection with FIGS. 3 and 4. FIG. 5 is a circuit-based block diagram illustrating an example radar apparatus with effectively-transparent diagnostic capabilities in a functional mode.

In FIG. 5, an adder 510 is included for adding a diagnostic object in the receive path after LNA 520, via a diagnostic phase offset at block 515 which is used to drive a low frequency signal generator 518. The output of the low frequency signal generator 518 is the second input to the adder 510. The circuit diagram of FIG. 5 may be considered an advantageous extension to the loopback approach discussed above with FIG. 4 in that the extension does not modify the signals associated with real objects but also does not necessarily test all high frequency circuitry (i.e., hardware). The encircled depicters 1, 2 and 2a of FIG. 5 show the power-frequency effects of this added low frequency signal.

Figure 6:
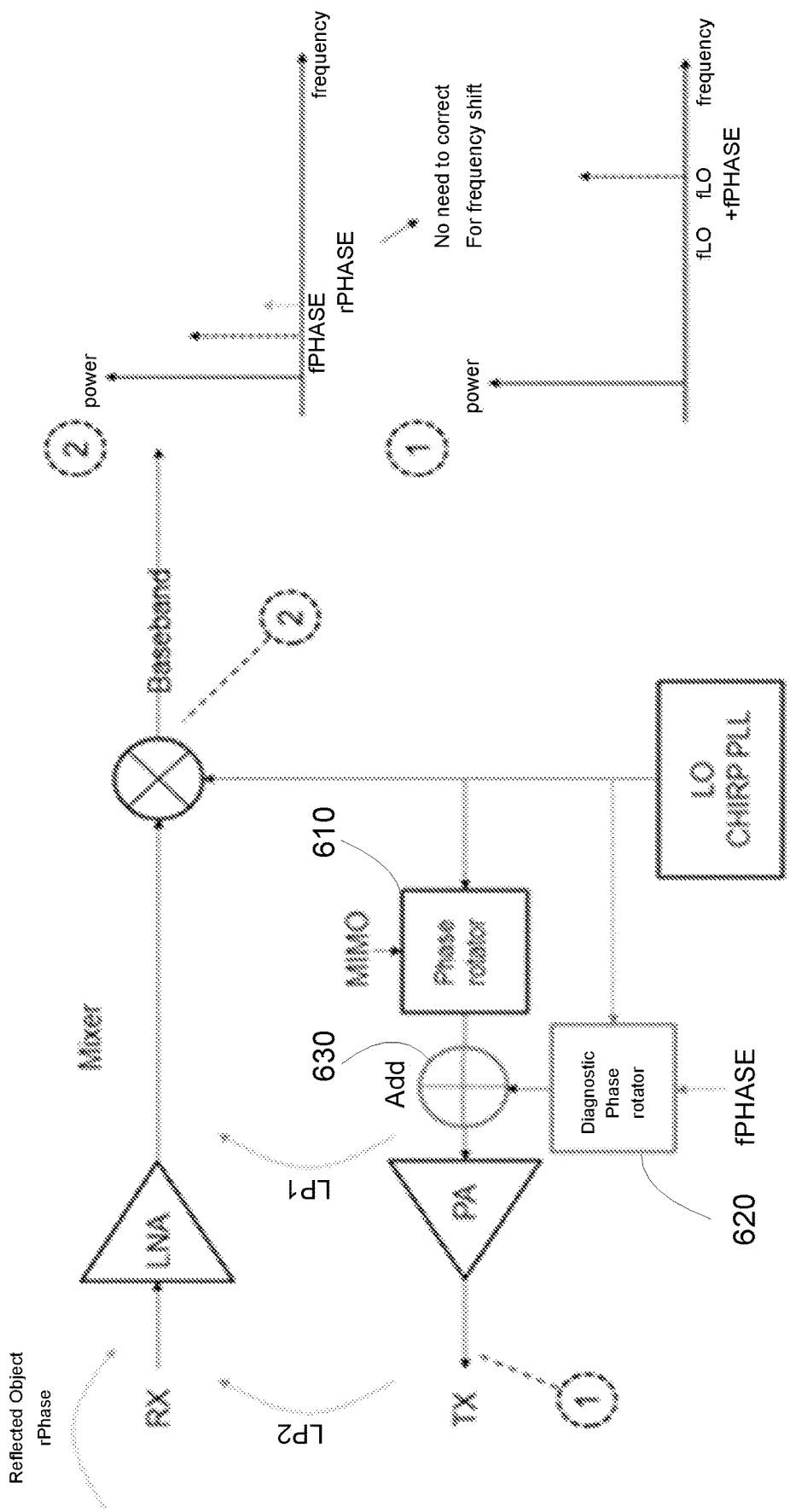
FIG. 6 is a circuit-based block diagram illustrating, as an alternative to the example of FIG. 5, adder circuitry to add a diagnostic object in the receive path in a way that does not modify signals from real reflected objects.

FIG. 6 is a circuit-based block diagram, similar to FIG. 5, illustrating an example radar apparatus with an adder circuit after the LNA for adding a diagnostic object but in a way that does not modify signals from real reflected objects. This approach, however, effectively requires two phase rotators 610 and 620 having outputs which are combined at an adder 630. The phase rotator 620 is for diagnostics, and together the phase rotators 610 and 620 operate to effect a full or continuous phase rotation which offsets the need to correct for a frequency shift as is the case in connection with FIG. 5 and as shown by way of the encircled depicters 1 and 2.

Figure 7:
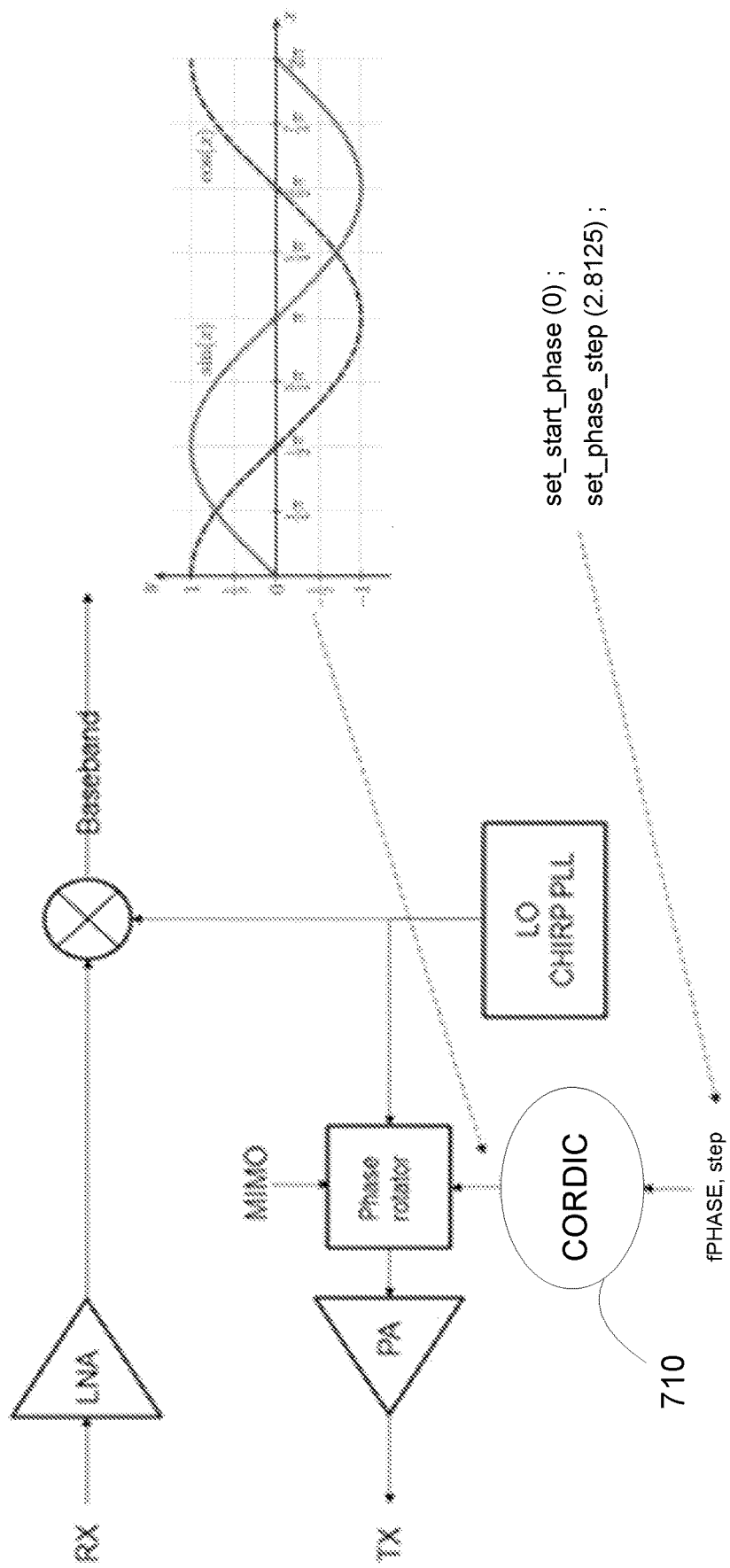
FIG. 7 is another circuit-based block diagram illustrating an example way in which software/code may be configurable for controlling phase rotator signals.
Figure 8:
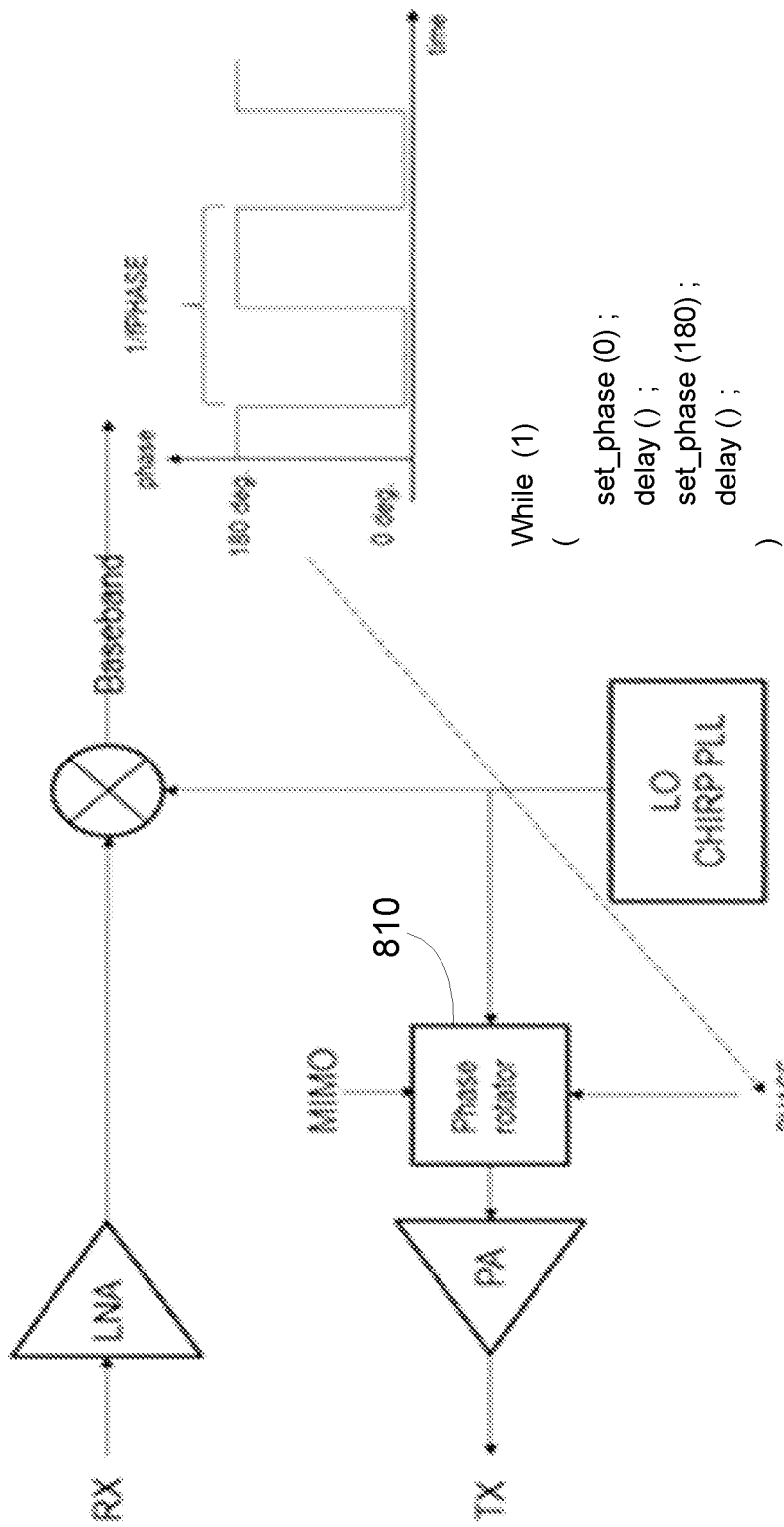
FIG. 8 is shows an alternative example block diagram illustrating a way in which phase rotator signals may be controlled.

This type of continuous phase rotation, for a full frequency shift, can be realized in different ways, as exemplified in connection with FIGS. 7 and 8. FIG. 7 shows an approach using software/code which is configurable to control a hardware (i.e., circuitry-based) CORDIC 710, which is used to control the actual phase rotator signals (CORDIC referring Coordinate Rotation Digital Computer). In this manner, a hardware CORDIC is used as it can apply a continuous phase rotation, and the hardware CORDIC can be parameterized in frequency of the phase rotation by the software/code.

Another exemplary approach for continuous phase rotation, also in accordance with the present disclosure, is shown by way of FIG. 8 with SW-controlled phase rotator circuitry 810. This approach may be useful, for example, where no hardware CORDIC is present. Such with SW-controlled phase rotator circuitry can apply at least 2 alternating phase settings (e.g., at 0 degrees and 180 degrees) in a time-equidistance manner so as to increase the transmit frequency.

Also in accordance with the present disclosure, it has been realized that the offset introduced in a transmit phase rotator (frequency) can be corrected by shifting the afore-mentioned FFT bins to the left by an amount of frequency offset such that the real detected objects are not influenced. For the object tracking filter to filter them out, such diagnostic objects may be short in duration or they may change over distance and velocity, thereby violating physical relations and needing to be filtered out and discarded in connection with processing of the object. These techniques are necessary when the objects are created during functional mode, but if done outside the functional mode these corrective actions are not necessary.

The above-disclosed examples of circuit diagnosis can be applied in different ways to such radar systems. One way may be referred to as application during acquisition. The circuit diagnosis can be applied during the normal radar chirping mode. The TX phase rotator (frequency) is continuously modulated with frequency fPHASE. As a result, the transmit frequency is elevated in frequency relative to the RX mixer LO (local oscillator) frequency. This approach permits for a circuit-based safety check during normal chirping operation.

Externally present radar targets may be elevated in the frequency domain by the frequency of the phase shifter rotation. By evaluating the power or amplitude of the signals at the respective frequencies for normal radar targets, if the approach involves the frequency spectrum of the signals associated with real objects being modified or shifted by the diagnostic object insertion, the frequency shift due to the continuously modulated frequency fPHASE can be overcome as discussed in connection with the above examples. As with examples consistent with above FIG. 6, however, the spectrum may be unmodified by diagnostic object insertion.

Another way to apply this scheme for diagnostic object insertion is to segment the radar cycle into different phases or phase-based modes and implement application during (and replacing) BIST, as follows: (i) an active phase of chirping (normal operation, no frequency shift); (ii) a diagnosis (BIST-like) phase but in which signals emulating chirps are applied consistent with above-noted aspects of the present disclosure; (iii) an idle phase in which no chirps are applied; and (iv) a restart phase where the active phase of normal chirping begins again. In different applications, segmentation as with phases (i), (iii) and (iv) have been previously applied in the radar domain. Phase (ii) in connection with the above-noted aspects of the present disclosure, does not however apply normal BIST mechanisms, but rather involves chirping the radar signal in a functional mode with a frequency shift applied for diagnosis purposes.

An advantage of these exemplary aspects of the present disclosure is a high likelihood of compatibility to existing radar integrated-circuit IC architectures and low requirements on linearity of the phase shifting mechanism. Additionally, isolation to external radar objects can be created by turning the TX PA and RX LNA off and rely mostly on internal coupling between Rx and Tx.

Another way involves application between chirps wherein normally unused phases of a radar chirp are used. These are phases, during which normally no data is acquired in the RX phase, due to linearity conditions not being fulfilled. In this option which is also according to the present disclosure, the TX phase shifter can increase the frequency of the TX signal and the RX data stream can be kept active. The data can be checked for presence of the expected RX tone, for example, at frequency fPHASE.

Also according to the present disclosure, the during the above-noted phase (ii) involving diagnosis corresponding to a BIST, during the BIST phase the LNA and PA can be turned off again, as discussed above to create isolation relative to external scenery. While the linearity within the BIST phase is not ideal, because the RX mixer LO and TX signal vary in the same way, this approach should not impact the baseband signal.

Terms to exemplify orientation, such as upper/lower, left/right, top/bottom and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

As examples, the Specification describes and/or illustrates aspects useful for implementing the claimed disclosure by way of various circuits or circuitry which may be illustrated as or using terms such as blocks, modules, device, system, unit, controller, processor and/or other circuit-type depictions depict an arrangement of circuitry. Such circuits or circuitry are used together with other elements to exemplify how certain embodiments may be carried out in the form or structures, steps, functions, operations, activities, etc. As examples, wherein such circuits or circuitry may correspond to logic circuitry (which may refer to or include a code-programmed/configured CPU), in one example the logic circuitry may carry out a process or method (sometimes "algorithm") by performing certain activities or steps (e.g., one step followed by another step).

For example, in certain of the above-discussed embodiments, one or more modules are discrete logic circuits or programmable logic circuits configured for implementing these operations/activities, as may be carried out in the approaches shown in the figures. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process as described throughout may be used by the programmable circuitry to perform the related steps, functions, operations, activities, etc. Depending on the application, the instructions (and/or configuration data) can be configured for implementation in logic circuitry, with the instructions (whether characterized in the form of object code, firmware or software) stored in and accessible from a memory (circuit).

Also, where the Specification may make reference to a "first [thing]", a "second [thing]", etc., the adjectives "first" and "second" are not used to connote any description of the structure or to provide any substantive meaning; rather, such adjectives are merely used for English-language antecedence to differentiate one such similarly-named thing (e.g., function or structure) from another similarly-named thing. For example, "first circuit configured to convert . . . " is interpreted as "circuit configured to convert . . . "). In a similar differentiating context for antecedence, "first", "second" and "third" before "effective signal delay" do not necessarily connote a specific link to information regarding any specific one of distance, velocity or direction of arrival (DoA).

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims.

What is claimed is:

1. An apparatus comprising:
a radar circuit to receive reflection signals, in response to transmitted chirp sequences, as reflections from objects remote from the apparatus;
computer processing circuitry to process data corresponding to the reflection signals and, in response, to generate output data indicative of distance, velocity and/or angle information; and
emulation circuitry to introduce one or more sets of diagnostic data into the radar circuit to cause circuit processing of simulated reflection signals as though the simulated reflection signals are reflections from the objects remote from the apparatus, each of the one or more sets of diagnostic data being respectively associated with one or more simulated targets and including a first effective signal delay to create the simulated reflection signals,
wherein each of the one or more sets of diagnostic data further includes a second effective signal delay between the chirp sequences to introduce a phase offset, and wherein the emulation circuitry and/or the radar circuit are to use transmit phase rotator to position the first effective signal delay and the second effective signal delay.

2. The apparatus of claim 1, wherein the chirp sequences are transmitted swept-frequency radar signals, and wherein the radar circuit, computer processing circuitry and the emulation circuitry are part of a continuous-wave radar system.

3. The apparatus of claim 2, wherein the continuous-wave radar system is a frequency-modulated-continuous-wave radar system.

4. The apparatus of claim 1, wherein the first effective signal delay is to introduce a frequency offset to create the simulated reflection signals.

5. The apparatus of claim 1, wherein the first effective signal delay is used to test the radar circuit and computer processing circuitry to assess integrity of the apparatus associated with measuring the distance.

6. The apparatus of claim 1, wherein the one or more sets of diagnostic data further includes a second effective signal delay between the chirp sequences, and the second effective signal delay is to introduce phase and/or delay offset which causes a frequency offset in the simulated reflection signals.

7. The apparatus of claim 1, wherein the first effective signal delay is to introduce a frequency offset between signals in a receive path of the radar circuit and a transmit path of the radar circuit via a continuous change of phase offset.

8. The apparatus of claim 1, wherein the emulation circuitry includes logic circuitry to control at least certain of the transmit phase rotator to position the first effective signal delay and the second effective signal delay.

9. The apparatus of claim 1, wherein the radar circuit includes a mixer to mix signals corresponding to the chirp sequences with the received reflection signals in response to the chirp sequences as reflections from objects at respective distances remote from the apparatus, and also to mix simulated signals corresponding to the chirp sequences with the simulated reflection signals.

10. The apparatus of claim 1, wherein the radar circuit includes a mixer to mix simulated signals corresponding to the chirp sequences with the simulated reflection signals and, in response to cause a low frequency signal to be introduced between chirps and between chirp sequences for indicating desired frequency and distance and/or velocity diagnostics in integrity testing of the radar circuit and the computer processing circuitry.

11. The apparatus of claim 1, further including a radar front-end circuit having the radar circuit and the emulation circuitry, wherein the radar circuit includes a mixer to mix simulated signals corresponding to the chirp sequences with the simulated reflection signals, and the computer processing circuitry.

12. The apparatus of claim 1, including a radar front-end circuit having the radar circuit and the emulation circuitry and further including comparison logic to access and compare entries from a local object list as processed by the computer processing circuitry in response to the emulation circuitry causing the radar circuit to process simulated reflection signal, for producing test results.

13. The apparatus of claim 1, wherein the emulation circuitry is to test front-end circuitry in the radar circuit.

14. The apparatus of claim 1, wherein the emulation circuitry is to test front-end circuitry in the radar circuit and/or the computer processing circuitry.

15. The apparatus of claim 1, further including: front-end circuitry integrated with the radar circuit; and phase rotator circuitry to effect a phase offset or phase adjustment in radar signals communicated via the front-end circuitry, wherein the phase offset or phase adjustment is compensated or accounted when using the emulation circuitry in a functional radar mode.

16. A method comprising:
receiving reflection signals in a radar circuit, in response to transmitted chirp sequences, as reflections from remote objects;
processing, in computer processing circuitry, data corresponding to the reflection signals and, in response, generating output data indicative of distance, velocity and/or angle information; and
via emulation circuitry, introducing a plurality of diagnostic data sets into the radar circuit to cause the radar circuit to process simulated reflection signals as though the simulated reflection signals are reflections from objects remote from the apparatus, each of the one or more sets of diagnostic data being respectively associated with one or more simulated targets and including a first effective signal delay to create the simulated reflection signals; and testing front-end circuitry in the radar circuit, using the first effective signal delay to assess integrity associated with measuring the distance, using a second effective signal delay between the chirp sequences to assess integrity associated with measuring velocity, and using a third effective signal delay to assess integrity associated with measuring direction of arrival.

17. An apparatus comprising:
a radar circuit to receive reflection signals, in response to transmitted chirp sequences, as reflections from objects remote from the apparatus;
front-end circuitry integrated with the radar circuit;
computer processing circuitry to process data corresponding to the reflection signals and, in response, to generate output data indicative of distance, velocity and/or angle information;
emulation circuitry to introduce one or more sets of diagnostic data into the radar circuit to cause circuit processing of simulated reflection signals as though the simulated reflection signals are reflections from the objects remote from the apparatus, each of the one or more sets of diagnostic data being respectively associated with one or more simulated targets and including a first effective signal delay to create the simulated reflection signals; and
phase rotator circuitry to effect a phase offset or phase adjustment in radar signals communicated via the front-end circuitry, wherein the phase offset or phase adjustment is compensated or accounted when using the emulation circuitry in a functional radar mode.

18. The apparatus of claim 17, wherein the chirp sequences are transmitted swept-frequency radar signals, and wherein the radar circuit, computer processing circuitry and the emulation circuitry are part of a continuous-wave radar system.

19. The apparatus of claim 17, wherein the first effective signal delay is to introduce a frequency offset to create the simulated reflection signals.

20. The apparatus of claim 17, wherein the first effective signal delay is used to test the radar circuit and computer processing circuitry to assess integrity of the apparatus associated with measuring the distance.

* * * * *